United States Patent Office 3,275,646
Patented Sept. 27, 1966

3,275,646
PREPARATION OF THIADIAZOLES
Peter Kirby, 80 Fauchons Lane, Maidstone, England; John Roberts, 247 Lansdale Drive, Gillingham, England; and John H. Davies, 43 Herne Bay Road, Whitstable, England
No Drawing. Filed Dec. 3, 1965, Ser. No. 511,318
Claims priority, application Great Britain, Dec. 8, 1964, 49,895/64
8 Claims. (Cl. 260—304)

This invention relates to a process for the production of hydroxy-substituted 1,2,3-benzothiadiazoles, which are starting materials in the preparation of valuable organic compounds, particularly suited as starting materials for the preparation of novel insecticidal phosphorylated 1,2,3-benzothiadiazoles.

Hydroxy - substituted 1,2,3-benzothiadiazoles may be represented by the following formula:

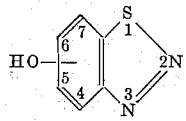

The numbering of these compounds throughout the specification will be in accordance with that shown on the above formula.

The methods of producing hydroxy-1,2,3-benzothiadiazoles have hitherto been somewhat tedius processes, and have so far led to the production of the known 4-, 5- and 6-hydroxy-1,2,3-benzothiadiazoles. We have now found a simple route to the hydroxy compounds which employs readily available starting materials and which makes available not only the known isomers but also the hitherto unknown 7-hydroxy-1,2,3-benzothiadiazole.

According to the invention, a process for the production of a hydroxy-1,2,3-benzothiadiazole comprises diazotisation of the appropriate aminobenzothiazole

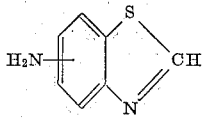

and acid hydrolysis of the diazotised reaction mixture to form the desired hydroxy-1,2,3-benzothiadiazole. All of the amino-1,2,3-benzothiazoles are known compounds.

In the past, hydroxy-1,2,3,-benzothiadiazoles have been prepared by a process which comprises diazotising an amino-1,2,3,-benzothiadiazole and hydrolysing the diazotised product. Amino-1,2,3-benzothiadiazoles, however, are not readily prepared. The process of the invention avoids the use of these compounds and employs as starting materials the known aminobenzothiazoles which are readily and conveniently prepared by, for example, the nitration and subsequent reduction of the commercially available compound benzothiazole.

The diazotisation step of the process according to the invention, can be carried out under conditions known for diazotisation. The usual conditions have been found to give satisfactory results, e.g. reacting the amino compound with sodium or potassium nitrite in the presence of an acid at a temperature below about 5° C. Excess sodium or potassium nitrite is preferably employed, between 1.5–3.0 moles per mole of aminobenzothiazole being particularly suitable. The acid is suitably a concentrated mineral acid, preferably sulfuric acid. However, in the diazotisation of 7-aminobenzothiazole, dilute acid, e.g. dilute sulfuric acid, is equally suitable; the use of dilute acid has advantage in that the hydrolysis step may be carried out directly with the diazotised reaction mixture without the need to dilute the mixture with water.

The hydrolysis step of the process according to the invention has to be carried out under dilute acidic conditions. Thus where dilute acid is used in the diazotisation step the resulting diazotised reaction mixture is in a suitable form for direct hydrolysis. Where concentrated acid is used however, suitable dilution of the resulting diazotised reaction mixture is necessary. The dilution may be effected by adding the reaction mixture to water, or preferably, to ice or an ice/water mixture, such that the volume of the diluted reaction mixture is between 1.5 and 3 times the original volume of the reaction mixture. Hydrolysis may be effected therefore by heating, preferably under reflux, the diazotised reaction mixture or the mixture suitably diluted with water.

A particularly convenient method of carrying out the hydrolysis step comprises adding the diazotised reaction mixture to refluxing dilute acid e.g. dilute sulfuric acid. Where concentrated acid is used in the diazotisation step addition of the diazotised reaction mixture to the refluxing dilute acid should be as rapid as possible.

The desired hydroxy-1,2,3-benzothiadiazole may be extracted and purified by established methods. The compounds are conveniently extracted with ether and purified by chromatography, e.g. using a silica gel column.

Aminobenzothiazoles, the starting materials in the process according to the invention, are known compounds, prepared by methods known in the literature, for example treating a nitrobenzothiazole with a reducing agent. It has been found that stannous chloride in hydrochloric acid, preferably in the presence of a lower alkanol, e.g. methanol, is a convenient reducing agent. Other reducing agents, for example zinc dust, tin or iron powder each in the presence of mineral acid, are also suitable.

The nitrobenzothiazoles, used in the prepartion of the aminobenzothiazoles which in turn are used in the preparation of the hydroxy-1,2,3-benzothiadiazoles, are known compounds, prepared by known methods, e.g. the nitration of benzothiazole. The method according to Ward and Poesche (J. Chem. Soc., 2825, 1961) is particularly suitable; they describe the mononitration of benzothiazole by means of a mixture of sulfuric and nitric acids and the separation of the mononitro isomers so formed. The nitration may be carried out according to the method of Ward and Poesche or other methods for example treating benzothiazole with a solution of a metal nitrate in concentrated sulfuric acid.

The 5-nitro isomer which is produced in low yield from the above process is preferably prepared according to the method of Spieler and Prijs (Helv. Chim. Acta., 1950, 33, 1429), which comprises reacting 2-mercapto-5-nitroaniline with formic acid, preferably 95% formic acid.

As mentioned previously the hydroxy-1,2,3-benzothiadiazoles are of particular value in the preparation of new insecticidally active phosphorylated compounds of the following general formula

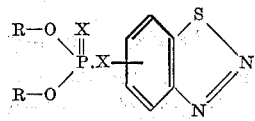

wherein each R represents alkyl, and each X represents oxygen or sulfur, can be prepared by a process comprising reacting the appropriate (thio) phosphoric or thiophosphoric acid chloride with the appropriate hydroxy-1,2,3-benzothiadiazole.

The process according to the invention is illustrated by the following examples in which parts by weight (w.)

and parts by volume (v.) bear the same reaction as the kilogram does to the litre:

EXAMPLE I.—PREPARATION OF 7-HYDROXY-1,2,3-BENZOTHIADIAZOLE

A. Preparation of 7-nitrobenzothiazole

Commercial benzothiazole was distilled at water pump pressure yielding a colorless liquid boiling at 101° C.

The benzothiazole (126.0 w.) was dissolved in concentrated sulfuric acid (200 v.) (d 1.84) keeping the temperature below 20° C. with vigorous stirring. Nitric acid (d 1.5, 100 v.) was added dropwise so that the temperature was maintained at 10±2° C. and this temperature maintained for one hour after complete addition. After storing in the refrigerator overnight the mixture was poured onto ice (1000 w.) with stirring. Aqueous ammonia (d 0.88) was added, keeping the temperature below 25° C. until the solids were slightly orange in color. The solids were then filtered off and washed with dilute ammonia and water. The solids were then stirred with water, filtered and sucked as dry as possible at the pump.

The solids were than dried in a vacuum oven at 80° C. These solids were dissolved in ethanol (2500 v.), the solution was filtered hot, and the filtrate cooled. The solid separating was then filtered off (52 w.) and redissolved in ethanol (2200 v. from mother liquor and 600 v. of fresh solvent). The solution was filtered while hot and left to cool overnight. The crystallized solids were filtered off and dried (43.2 w.), M.P. 175–176° C. This compound was 6-nitrobenzothiazole (lit. M.P. 177° C.).

The mother liquor from the crystallization was stripped under vacuum and the remaining solids steam distilled until 23 w. of steam distilled material was obtained. The steam distilled material was dissolved in a mixture of methanol (1645 v.) and sodium hydroxide (11.75 v. in 235 v. of methanol). During the addition of the methanolic sodium hydroxide, the temperature was maintained at 25° C. The mixture was stirred for 4 hours and then cooled overnight in the refrigerator. The solids which had separated were filtered off, washed with ethanol, and dried (14.3 w., M.P. 145° C.). These solids were recrystallized from xylene to give 7-nitrobenzothiazole (11 w.), M.P. 154–155° C. (lit. M.P. 155° C.).

The non-steam volatile material from the steam distillation was dissolved in hot methanol. This methanol solution was concentrated and set aside to crystallize. The solid which separated was twice crystallized from hot xylene and passed down a silica gel column in dichloromethane affording 4-nitrobenzothiazole (4.6 w.), 135–136° C. (lit. M.P. 137° C.).

B. Preparation of 7-amniobenzothiazole 7-nitrobenzothiazole (2 w., 0.011 mole), methanol (20 v.), concentrated hydrochloric acid (20 v.) and stannous chloride (10 w., 0.044 mole) were refluxed on a steam bath for 1 hour. Methanol was then removed under reduced pressure and the residue dissolved in water. The solution was made strongly basic with 3N potassium hydroxide solution and extracted with ether. Evaporation of the dried extract gave 7-aminobenzothiazole, M.P. 115–116° C. Yield 1.1 w. (66%).

Analysis (percent by weight).—Found: C, 55.7; H, 4.2; N, 18.5; S, 21.1%. $C_7H_6N_2S$ requires: C, 55.9; H, 4.0; N, 18.7; S, 21.3%.

C. Preparation of 7-hydroxy-1,2,3-benzothiadiazole 7-aminobenzothiazole (2.4 w., 0.016 mole), as prepared by the method described above, was dissolved in concentrated sulfuric acid (50 v.) and the solution cooled to 2–3° C. and stirred. A solution of sodium nitrite (2.0 w., 0.029 mole) in concentrated sulfuric acid (20 v.) was added in one portion and the mixture stirred at 2–3° C. for three hours and then poured onto ice (50 v.). The resulting solution was refluxed for two and a half hours, cooled, diluted with water (200 v.) and extracted with ether. Evaporation of the extract gave 2.0 w. of the crude product. Chromatography on silica gel in methylene dichloride/acetone (95:5 v./v.) gave pure 7-hydroxy-1,2,3-benzothiadiazole, M.P. 233° C. Yield 1.8 w. (74%).

Analysis (percent by weight).—Found: C, 47.1; H, 2.8; S, 20.0%. $C_6H_4N_2OS$ requires: C, 47.4; H, 2.7; S, 21.1%.

EXAMPLE II.—PREPARATION OF 6-HYDROXY-1,2,3-BENZOTHIADIAZOLE

A. Preparation of 6-nitrobenzothiazole
Described in Example I.

B. Preparation of 6-aminobenzothiazole

Prepared from N-nitrobenzothiazole by the method shown in Example I for the conversion of 7-nitro- to 7-aminobenzothiazole.

C. Preparation of 6-hydroxy-1,2,3-benzothiadiazole 6-aminobenzothiazole (5.0 w.; 0.033 mole) was dissolved in concentrated sulfuric acid (100 v.) with stirring and the solution cooled to 0° C. Sodium nitrite (5.0 w.; 0.0725 mole) in concentrated sulfuric acid (25 v.) was added in portions at 0–5° C. and then poured onto ice (225 w.). The diluted solution was added to refluxing 50% sulfuric acid (280 v.) and refluxing continued for 1 hour after the addition had been completed. The solution was cooled and extracted with ether. Evaporation of the dried extracts gave crude 6-hydroxy-1,2,3-benzothiadiazole. Chromatography on silica gel in ether gave pure 6-hydroxy-1,2,3-benzothiadiazole as a cream-colored powder (1.5 w., 30%), M.P. 211–213° C.

Analysis (percent by weight).—Found: C, 47.8; H, 2.5; S, 20.9%. $C_6H_4N_2OS$ requires: C, 47.4; H, 2.6; S, 21.1%.

EXAMPLE III.—PREPARATION OF 5-HYDROXY-1,2,3-BENZOTHIADIAZOLE

A. Preparation of 5-nitrobenzothiazole 2-bromo-5-nitroaniline (37.5 w., 0.173 mole) was dissolved in refluxing industrial methylated spirit (400 v.) and the solution stirred vigorously. A solution of sodium sulfide (62.3 w., 0.259 mole) and sodium bicarbonate (21.8 w., 0.259 mole) in water (170 v.) was added dropwise over 2 hours, and stirring and refluxing continued for 1 hour. Sodium hydroxide (6.91 w., 0.173 mole) in water was added and the solution poured onto crushed ice (1000 w.), stored until the ice had melted, and then filtered. The dark red solution was exactly neutralized with concentrated hydrochloric acid (69 v. of a solution of 80.4 v. of 38% acid diluted to 100 v.) and extracted with chloroform until the copious yellow precipitate had been dissolved. Evaporation of the dried extracts under reduced pressure gave crude 2-amino-4-nitrobenzenethiol, M.P. 96–98° C. (25 w., 85%).

2-amino-4-nitrobenzenethiol (5.1 w., 0.03 mole) and 98% formic acid (100 v.) were stirred at 50–60° C. for 2 hours during which time the solid dissolved. The solution was refluxed for 1 hour, cooled and poured into an excess of cold water. The solids were filtered off and dried in vacuo. Chromatography of the crude material on silica gel in methylene dichloride gave pure 5-nitrobenzothiazole (42 w., 78%), M.P. 163–164° C.

Analysis (percent by weight).—Found: C, 46.6; H, 2.1; N, 15.6; S, 17.5%. $C_7H_4N_2O_2S$ requires: C, 46.7; H, 2.2; N, 15.6; S, 17.8%.

B. Preparation of 5-aminobenzothiazole

Prepared from 6-nitrobenzothiazole by the method shown in Example I for the conversion of 7-nitro- to 7-aminobenzothiazole.

C. Preparation of 5-hydroxy-1,2,3-benzothiadiazole 5-aminobenzothiazole (3.0 w., 0.02 mole) was dissolved in concentrated sulfuric acid (30 v.) with stirring. The solution was cooled to 0° C. and sodium nitrite (3.45 w.; 0.05 mole) in concentrated sulfuric acid (20 v.) added portionwise over half an hour to the cooled solution. The solution was stirred for 3 hours at 0–5° C. and then poured onto sufficient ice to keep the temperature below 5° C. This solution was added as rapidly as possible to refluxing dilute sulfuric acid (50 v. concentrated acid; 100 v. of water) and refluxing continued for one and a half hours. The reaction mixture was cooled, made alkaline (pH 11) with sodium hydroxide solution and filtered. The filtrate was acidified (pH 4–5) with dilute sulfuric acid and extracted with ether; the ether extract was dried and evaporated to give a black oil (1.4 w.). This was redissolved in ether and passed down a column of silica gel (Whatman S.G. 31); the eluate was evaporated giving a light brown powder (1.1 w.), M.P. 134–145° C. The powder was chromatographed on a silica gel column in chloroform yielding two bands. The first of these bands was 5-hydroxy-1,2,3-benzothiadiazole (0.5 w.), M.P. 160–161° C. (identical with M.P. of a sample produced by diazotisation and hydrolysis of 5-amino-1,2,3-benzothiadiazole).

We claim as our invention:

1. A process for the preparation of a hydroxy-1,2,3-benzothiadiazole which comprises diazotisation of the appropriate aminobenzothiazole and acid hydrolysis of the diazotised reaction mixture to form the desired hydroxy-1,2,3-benzothiadiazole.

2. A process as defined in claim 1 wherein the diazotisation is effected by reacting the aminobenzothiazole with an excess of sodium or potassium nitrite in the presence of an acid at a temperature below about 5° C.

3. A process as defined in claim 2 wherein the acid is a concentrated mineral acid.

4. A process as defined in claim 3 wherein the acid is sulfuric acid.

5. A process as defined in claim 1 wherein 7-aminobenzothiazole is reacted with sodium or potassium nitrite in the presence of dilute sulfuric acid.

6. A process as defined in claim 5 wherein the hydrolysis step is effected by heating the diazotised reaction mixture.

7. A process as defined in claim 1 wherein the hydrolysis step is effected by suitably diluting the diazotised reaction mixture and heating the diluted mixture.

8. A process as claimed in claim 1 wherein the hydrolysis is effected by adding the diazotised reaction mixture to refluxing dilute sulfuric acid.

No references cited.

ALEX MAZEL, *Primary Examiner.*

ALTON D. ROLLINS, *Assistant Examiner.*